L. Caples,
Horse Power.
Nº 6,614.    Patented July 31, 1849.
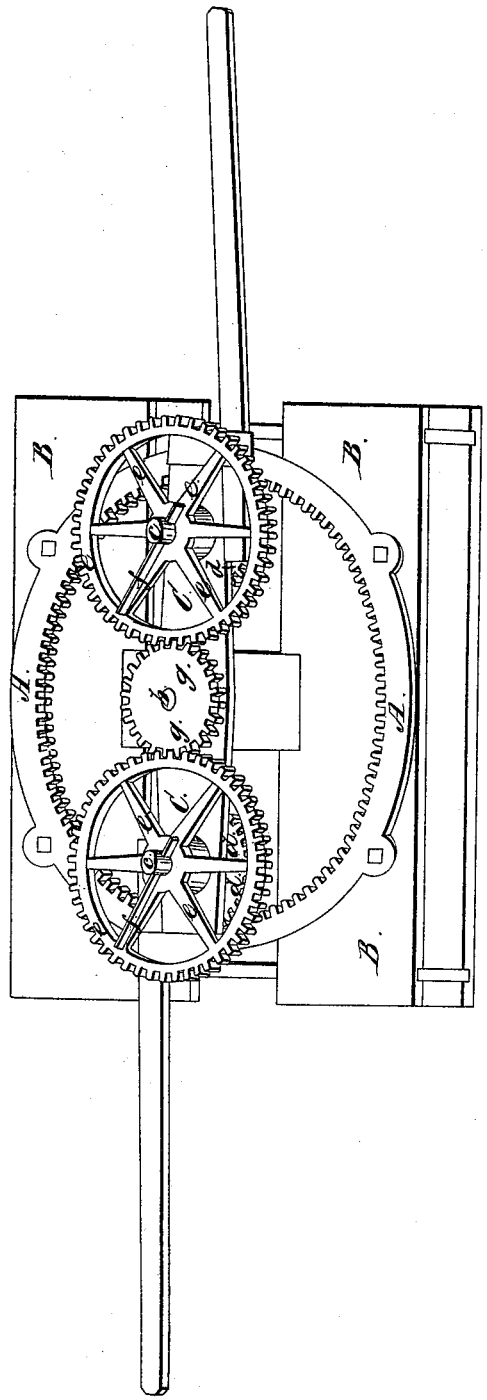

UNITED STATES PATENT OFFICE.

CHARLES CAPLES, OF SAVANNAH, MISSOURI.

EQUALIZING THE ACTION OF GEARING IN HORSE-POWERS.

Specification of Letters Patent No. 6,614, dated July 31, 1849.

*To all whom it may concern:*

Be it known that I, CHARLES CAPLES, of Savannah, in the county of Andrew and State of Missouri, have invented a certain new and useful improvement in machinery particularly applicable to horse-powers, by which the strain on the teeth of the cog-wheels is equalized and their wear rendered more uniform; and I do hereby declare that the following is a full, clear, and exact description of the same, reference being had to the accompanying drawing, which forms part of this specification and which is a perspective view of a horse-power with my improvement applied thereto.

My invention consists in attaching the wheels to their spindles by flexible bars or springs, instead of the usual rigid methods of keys, plugs, or pins.

In the accompanying drawing, A is the stationary annular wheel attached to the frame work B, which latter may be made in any convenient form; $b$, the axis of the moving frame C; through this frame C, pass the spindles $c$, $c$, of the wheels $d$, $d$, working into the annular wheel A; to the opposite extremities of the spindles $c$, $c$, are attached the wheels $e$, $e$; in the usual methods of constructing horsepowers these wheels $e$, $e$, are rigidly secured to the spindles $c$, $c$, whence it happens that unless all the teeth of the annular wheel A are exactly of the same size and at equal distances from each other, and unless the teeth of the wheels $d$, $d$, have the same exactness of construction, the teeth of the wheels $d$, $d$, will not bear equally on the teeth of the annular wheel A; and it may even happen that the teeth of one of the former wheels may be sustaining the whole strain of the moving-power, the other wheel merely revolving without its teeth coming in contact with those of the wheel A. In order to obviate this difficulty I attach the wheels $e$, $e$, to the spindle $c$, $c$, by means of the spring-bars $f$, $f$, one end of which is firmly fixed to the spindle $c$, the other end being attached to the wheel $e$; or, one end of the spring-bar being firmly fixed to the wheel $e$, the other extremity passing through the spindle $c$, on either side of the wheel $e$; the distance between the bearing points and the stiffness of the bar being such as will allow of sufficient movement of the wheel on its spindle to compensate the imperfections in the construction of the teeth.

The use of but two spring bars is sufficient to obviate any difficulty that might arise from imperfections in the construction of the teeth of the wheels $e$, $e$, and of those of the central wheel $g$, as well as those of the lower wheels A, $d$, $d$.

The arrangement of attaching wheels to their axles possesses the additional advantage of overcoming the rigidity of a system of metal wheelwork, and by allowing a partial yielding, greatly diminishes the chances of breakage from sudden shocks.

What I claim as my invention and desire to secure by Letters Patent, is—

Equalizing the strain and lessening the force of shocks upon a train of cog wheels by connecting the wheels with their shafts by springs substantially as herein set forth.

In testimony whereof I have hereunto signed my name this twenty-eighth day of February A. D. 1849.

CHARLES CAPLES.

Witnesses:
WM. D. WASHINGTON,
P. H. WATSON.